Oct. 14, 1952 — H. M. KELLOGG — 2,613,977
PIECRUST LIFTER
Filed May 25, 1946

INVENTOR.
Henry Morgan Kellogg
BY
Johnson, Kline and Hensel
ATTORNEYS

Patented Oct. 14, 1952

2,613,977

UNITED STATES PATENT OFFICE 2,613,977

PIECRUST LIFTER

Henry Morgan Kellogg, Stratford, Conn.

Application May 25, 1946, Serial No. 672,299

3 Claims. (Cl. 294—1)

This invention relates to a pie crust lifter, particularly adapted to convey dough rolled out for pie crust from a pastry board to a baking pan or pie plate.

Removal of thin layers of pie crust dough from a pastry board to a pie plate constitutes a relatively difficult operation because of the fragile nature of the thin layer of dough. A method commonly used involves rolling the layer of dough on a rolling pin, and unrolling same over the pie plate. This however, has disadvantages in that it is difficult to center the dough on the tin, and if the dough is relatively short or thin it is likely to tear or separate.

Lifters of various types comprising a thin flat sheet of metal have been used for handling relatively small pieces of dough, such as cookies, but have not been successfully used in households for handling larger pieces of dough as used for pie crusts, because of the difficulty of manipulating the dough from the lifter to the pie tin without tearing the crust.

It is an object of this invention to provide a pie crust lifter adapted to convey a thin layer of pie crust dough from a pastry board to a baking tin or pie plate without substantial tendency to tear the dough, and adapted to be conveniently manipulated for depositing the dough in a pie plate in the desired centralized position.

Another object is to provide a pie crust lifter having the foregoing advantages, and also being simple and economical to manufacture, having a flat shape so as to fit readily into a drawer, and of pleasing streamlined appearance suitable for a modern kitchen.

A pie crust lifter in accordance with my invention is constructed of any suitable, thin, flexible, resilient material, preferably sheet metal, e. g. sheet aluminum, this metal being preferred to avoid corrosion. The lifter has a flat body portion substantially rectangular at the front and having an up-turned portion or flange, for example, an upwardly curled portion at its rear edge to serve as a handle in manipulating the lifter and also stiffening a part of the rear edge against transverse flexure.

The body is transversely flexible upon manipulation of its sides with both hands to form a trough for guiding a layer of pie crust dough supported on the lifter into a pie plate in the desired manner. For this purpose the upwardly turned rear edge preferably extends only part way across the rear edge of the lifter and is substantially in the mid-portion thereof. The absence of any stiffening for the projecting sides of the body facilitates flexure thereof when grasped by both hands so as to form a guiding trough for the dough as aforesaid.

Moreover, the rear edge of the lifter, including the up-turned portion is constructed so as to permit the hands to move around from side to side of the lifter while holding the same without encountering any substantial obstruction. Thus, manipulation of the lifter and flexure thereof to deposit the dough accurately in the desired position is facilitated. For example, the rear portions of the side edges of the lifter preferably curve arcuately inward toward their junction with the up-turned flange, and preferably the edge of the latter is a continuation of the arcuate edge portions of the body of the lifter. With such construction, maximum smoothness at the rear portion of the lifter is secured, so that no obstruction is offered to manipulation of the lifter in shifting the hands from one side to the other.

Other objects and advantages of my invention will appear from the following description, taken in connection with the accompanying drawing, wherein Figure 1 is a perspective view of a pie crust lifter in accordance with my invention.

Figure 1:
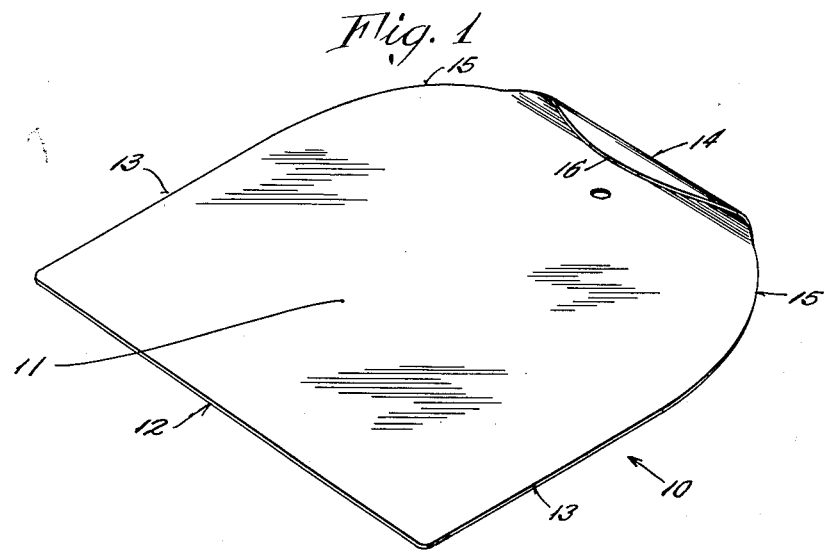
Figure 2:
Fig. 2 is a side elevation of the same.
Figure 3:
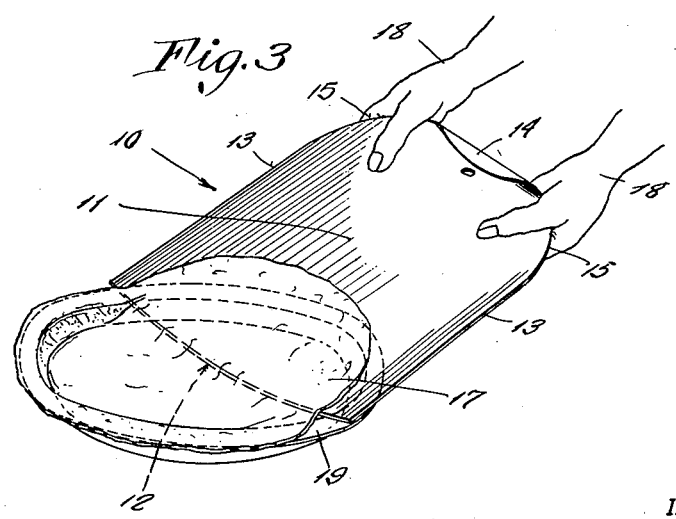
Fig. 3 is a perspective view of the pie crust lifter during use.

Referring to the drawing, the pie crust lifter 10 of my invention comprises a flat body portion 11 of thin, flexible, preferably resilient, material such as sheet aluminum, of sufficiently large size to receive all but the edge portions of a layer of pie crust dough to be transferred thereby from a pastry board to a pie plate. In the embodiment illustrated, the lifter has a substantially straight front edge 12, and straight side edges 13 at right angles thereto, extending rearwardly for the major portion of the length of the lifter. The mid-portion 14 of the rear edge of the lifter is curled upward and preferably inward, as illustrated, to form a handle stiffening the rear mid-portion of the lifter against transverse flexure. The straight portion 13 of the side edges join the up-turned rear portion 14 along arcuate edge portions 15, while the edge 16 of the up-turned mid-portion 14 is preferably a continuation of the arcuate edge portions 15 so as to avoid presenting obstruction to, and to facilitate movement of the hands from one side of the lifter to the other during manipulation thereof.

Thus, the lifter can be made from a single piece of flat sheet metal having one end of rectangular shape, and the opposite end cut in a wide, more or less semi-circular arc. The up-turned handle is formed by upwardly curling the mid-portion of the arcuate edge.

In using the lifter, pie dough 17 is first rolled out on a pastry board and then slid on to the lifter by hand, or the lifter is inserted with its front edge 12 under the layer of dough and slid under the same. The lifter with the dough supported thereon is raised from the board by means of the upwardly curled handle portion 14, and then grasped on either side thereof along the arcuate portions 15 adjacent its rear and side edges with two hands 18. The lifter is held over a pie plate 19 and then the arcuate portions 15 grasped between the hands are manipulated to flex the sides of the lifter upward, thus forming a trough for guiding dough toward the front edge of the lifter. The dough is then caused to slide from the front edge of the lifter by flapping or jiggling the lifter up and down while maintaining the flexure to form a trough, and at the same time withdrawing the lifter from under the dough as it is deposited in the pie plate. By tilting or moving the lifter sideways, the dough can be accurately guided into centralized position in the pie plate without danger of tearing the dough. Absence of obstructions to movement of the hands around the lifter at the rear edge permit convenient manipulation thereof in flexing the lifter, in conveying the dough on the lifter from the board to the pie plate, and in depositing the dough in the plate.

It will also be observed that the lifter by virtue of its continuous edge portions presents a streamlined, pleasing appearance well suited for a modern kitchen.

Variations and modifications may be made within the scope of this invention and portions of the improvements may be used without others.

I claim:

1. A pie crust lifter comprising a thin flat body of flexible resilient sheet material of substantially uniform thickness throughout having at its rear an upwardly curled edge located at the mid-portion and extending only part way of the full width of said body, the forward edge portion being the same thickness as the flat body portion and said curled edge serving as a holding means and stiffening the rear and mid-portion only of the lifter against transverse flexure so that said body and forward edge are transversely flexible and may be bent to a longitudinal concavely curved shape by manipulation with both hands engaging the rear edge portion of the lifter on opposite sides of said upwardly curled portion to form a trough for guiding a pie crust supported thereon to a pie plate.

2. A pie crust lifter comprising a thin body of flexible resilient sheet material that will lie substantially flat on an even surface and having at its rear an upwardly curled edge located at the mid-portion and extending only part way to the sides thereof, the edges of the body curving arcuately from said upwardly turned portion to join the side edges thereof so as to permit unobstructed movement of the hands around said upturned portion to either side of the lifter, the forward edge of said body being of the same thickness as the body portion so that said body including the forward edge is flexible and may be bent by both hands grasping the arcuate portions of the edge of the body to form a longitudinal trough for guiding the pie crust supported on the lifter into a pie plate.

3. A pie crust lifter comprising a thin body of flexible sheet material having a rectangular shape at its front end and an arcuate edge at its rear end, the mid-portion only of said arcuate edge being curled upward and inward on the top side only to form a handle, and to stiffen the mid-portion only of the lifter against transverse flexure, the remainder of said body including its forward edge being of substantially uniform thickness throughout so that said body including the forward edge is transversely flexible and may be bent by both hands grasping the arcuate portions of the edge on either side of said upwardly curled portion to form a longitudinal trough for guiding a pie crust supported on the lifter into a pie plate.

HENRY MORGAN KELLOGG.

REFERENCES CITED

The following references are of record in the file of this patent:

UNITED STATES PATENTS

| Number | Name | Date |
| --- | --- | --- |
| D. 23,068 | Leggett | Feb. 13, 1894 |
| 695,502 | Smith | Mar. 18, 1902 |
| 1,261,844 | Orr | Apr. 9, 1918 |
| 1,419,756 | Putnam et al. | June 13, 1922 |
| 1,704,329 | Klaus | Mar. 5, 1929 |
| 1,728,211 | McClellan | Sept. 17, 1929 |
| 2,064,136 | Winger | Dec. 15, 1936 |
| 2,134,807 | Winger | Nov. 1, 1938 |